United States Patent
Meissner et al.

(10) Patent No.: US 9,127,924 B2
(45) Date of Patent: Sep. 8, 2015

(54) INTERFEROMETER

(71) Applicant: DR. JOHANNES HEIDENHAIN GMBH, Traunstein (DE)

(72) Inventors: Markus Meissner, Übersee (DE); Ralph Joerger, Traunstein (DE); Jörg Drescher, Samerberg (DE); Wolfgang Holzapfel, Obing (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 0 days.

(21) Appl. No.: 14/301,898

(22) Filed: Jun. 11, 2014

(65) Prior Publication Data

US 2014/0376002 A1    Dec. 25, 2014

(30) Foreign Application Priority Data

Jun. 21, 2013    (DE) .......................... 10 2013 211 758

(51) Int. Cl.
*G01B 9/02*    (2006.01)

(52) U.S. Cl.
CPC ........ *G01B 9/02015* (2013.01); *G01B 9/02018* (2013.01); *G01B 9/02019* (2013.01); *G01B 9/02027* (2013.01); *G01B 9/02061* (2013.01); *G01B 2290/70* (2013.01)

(58) Field of Classification Search
CPC ...... G01B 9/02; G01J 9/02; G01J 2009/0261; G01J 4/04; G01N 21/45
USPC ........................................................ 356/491
See application file for complete search history.

(56) References Cited

U.S. PATENT DOCUMENTS

| 4,752,133 | A | 6/1988 | Sommargren | |
|---|---|---|---|---|
| 2008/0062432 | A1* | 3/2008 | Sandig et al. | 356/499 |
| 2012/0112050 | A1 | 5/2012 | Joerger et al. | |
| 2013/0057872 | A1* | 3/2013 | Holzapfel | 356/498 |
| 2014/0176962 | A1* | 6/2014 | Holzapfel et al. | 356/491 |

OTHER PUBLICATIONS

European Search Report, dated Oct. 29, 2014, issued in corresponding European Patent Application No. 14171054.1.

* cited by examiner

*Primary Examiner* — Tarifur Chowdhury
*Assistant Examiner* — Md Rahman
(74) *Attorney, Agent, or Firm* — Kenyon & Kenyon LLP

(57) ABSTRACT

An interferometer includes a light source, beam splitter, measuring reflector, reference retroreflector, detector system, and two transparent plane plates. The beam splitter splits a first beam of rays, emitted by the light source, into at least one measuring beam and at least one reference beam, defining a first splitting plane. The measuring beam propagates in a measuring arm and the reference beam propagates in a reference arm until being recombined at a recombining location, which is oriented parallel to the first splitting plane. The measuring reflector is disposed in the measuring arm, and the reference retroreflector is disposed in the reference arm. The first and second transparent plane plates are disposed parallel to each other in the beam path between the light source and the detector system. The reference retroreflector is formed in the first plane plate and the beam splitter is disposed on the second plane plate.

15 Claims, 11 Drawing Sheets

INTERFEROMETER

CROSS-REFERENCE TO RELATED APPLICATIONS

The present application claims priority to Application No. 10 2013 211 758.2, filed in the Federal Republic of Germany on Jun. 21, 2013, which is expressly incorporated herein in its entirety by reference thereto.

FIELD OF THE INVENTION

The present invention relates to an interferometer, e.g., that is particularly suitable for the high-precision measurement of length and/or distance.

BACKGROUND INFORMATION

A plane-mirror interferometer is described in U.S. Pat. No. 4,752,133 and includes a light source, a beam splitter, and a detector system. A beam of rays emitted by the light source is split via the beam splitter into at least one measuring beam and at least one reference beam. The measuring beam and the reference beam then propagate in a measuring arm and in a reference arm, respectively, until they are recombined at the beam splitter. In the measuring arm, a measuring reflector in the form of a plane mirror is provided on a movable object to be measured. The reference arm has at least one reference retroreflector. With the aid of the detector system, at least one distance signal is ascertainable from the recombined interfering measuring and reference beams with regard to the position of the object to be measured.

As described in U.S. Pat. No. 4,752,133, a polarization beam-splitter cube is provided as a beam splitter, and a triple prism is used as a reference retroreflector. Alternative arrangements of reference retroreflectors having a plurality of triple prisms may also be provided. The triple prism of the reference retroreflector is adhered onto or wrung to the beam-splitter cube. In addition, the triple prism may also be placed spatially separate from the beam-splitter cube.

It is disadvantageous with regard to such interferometers that both the polarization beam-splitter cube and the triple prism can only be produced with great expense. Thus, in the case of the beam-splitter cube, the various sides must be aligned highly exactly relative to each other, especially if one or more triple prisms and possibly further optical components are disposed directly on it. In the case of the spatially separate placement of beam-splitter cube and triple prisms, a very costly low-drift mounting of these components is likewise necessary. In addition, if great tilt tolerances of the object to be measured are demanded, the triple prism must be constructed to be relatively large.

SUMMARY

Example embodiments of the present invention provide a compactly constructed interferometer having optical components that are simple to manufacture.

According to example embodiments of the present invention, an interferometer includes a light source, a beam splitter, a measuring reflector, a reference retroreflector, a detector system, and two transparent plane plates. The beam splitter splits a first beam of rays, emitted by the light source, into at least one measuring beam and at least one reference beam, via which a first splitting plane is spanned. Up until being recombined at a recombining location in a first recombining plane, the measuring beam propagates in a measuring arm and the reference beam propagates in a reference arm. The first recombining plane is oriented parallel to the first splitting plane. The measuring reflector is situated in the measuring arm and is joined to an object to be measured which is movable along a measuring direction. The measuring beam falls perpendicularly onto the measuring reflector at least twice. The reference retroreflector is situated in the reference arm, the reference beam falling on the reference retroreflector at least once. At least one first distance signal with regard to the position of the object to be measured is ascertainable via the detector system from the interfering measuring and reference beams superposed at the recombining location. The first transparent plane plate and the second transparent plane plate are arranged parallel to each other in the beam path between the light source and the detector system. The measuring reflector is arranged in a manner allowing movement relative to the two plane plates along the measuring direction. The reference retroreflector is formed in the first plane plate and the beam splitter is provided on the second plane plate.

The reference retroreflector in the first plane plate may be arranged as a diffractive retroreflector and may include at least one grating lens disposed on one side of the first plane plate and at least one plane reflector which is disposed on the opposite side of the first plane plate and whose reflective side is oriented in the direction of the grating lens, and the at least one grating lens deflecting and focusing the reference beam falling on it, onto the reflector.

In addition, the first plane plate may have at least one delay unit, along which the reference beam propagates, and the delay unit may include at least two plane reflectors which are located on opposite sides of the first plane plate, the reflective surfaces of the reflectors each being oriented in the direction of the opposite side of the first plane plate.

In this context, it is possible that the at least one delay unit, which the reference beam traverses in the first plane plate, is formed such that between being split and being recombined, the reference beam and the measuring beam traverse identical travel distances in the two plane plates.

The beam splitter on the second plane plate may be in the form of a polarization-optical beam-splitter layer which is disposed on a first side of the second plane plate, and this side being oriented in the direction of the first plane plate.

It may further be provided that at least one measuring retroreflector in the form of a diffractive retroreflector is formed in the second plane plate and includes at least one grating lens situated on one side of the second plane plate and at least one plane reflector which is disposed on the opposite side of the second plane plate and whose reflective side is oriented in the direction of the grating lens, and the grating lens deflecting and focusing the measuring beam falling on it, onto the reflector.

Moreover, it may be provided that perpendicularly set apart with respect to the first splitting plane, at least one second beam of rays falls on the first plane plate in a second splitting plane, and the two plane plates are formed in a further area such that with regard to the second beam of rays, an identical beam course results in the second splitting plane and in a second recombining plane as in the first splitting and recombining planes, and a second distance signal is thereby able to be generated concerning the movement of the object to be measured along the measuring direction.

It is possible that in the first splitting plane, set apart with respect to the first beam of rays, at least one second beam of rays falls on the first plane plate, and the two plane plates are formed in a further area such that with regard to the second beam of rays, an identical beam path results in the first splitting plane and in the first recombining plane as in the case of the first beam of rays, and a second distance signal is thereby able to be generated concerning the movement of the object to be measured along the measuring direction.

The second plane plate may include a first imaging element having: at least one first grating lens and at least one second grating lens, both of which are disposed on one side of the second plane plate, and at least one first plane reflector which is situated on the opposite side of the second plane plate and whose reflective side is oriented in the direction of the first and second grating lenses, the first imaging element enlarging the beam diameter of the measuring beam falling on it. The first plane plate may include a second imaging element having: at least one third grating lens and at least one fourth grating lens, both of which are disposed on one side of the first plane plate, and a second plane reflector which is situated on the opposite side of the first plane plate and whose reflective side is oriented in the direction of the third and fourth diffractive grating lenses, the second imaging element reducing the beam diameter of the measuring beam falling on it.

In such an arrangement, it may be provided that in each case the first and third grating lenses focus the measuring beam falling on them, and in each case the second and fourth grating lenses collimate the measuring beam falling on them.

Furthermore, it is possible that after passing through the first imaging element, the measuring beam propagates in an intermediate plane in the direction of the measuring reflector, and the intermediate plane is located between the first splitting plane and the first recombining plane and is oriented parallel to them; and after passing through the second imaging element, the measuring beam propagates in the first recombining plane.

It may be provided that the reference retroreflector in the first plane plate takes the form of a diffractive retroreflector and includes two grating lenses as well as a plane reflector disposed on one side of the first plane plate, and two plane reflectors disposed on the opposite side of the first plane plate, the reflective sides of the reflectors each being oriented toward the opposite side, so that the reference beam falling on the first plane plate in the first splitting plane initially passes through an optically ineffective area of the first plane plate and strikes the first grating lens, via which the reference beam is deflected in the direction of the opposite first plane reflector, the first plane reflector deflecting the reference beam in the direction of the opposite second plane reflector in the intermediate plane, the second plane reflector deflecting the reference beam in the direction of the opposite third plane reflector, and the third plane reflector deflecting the reference beam in the direction of the second grating lens in the first recombining plane.

Furthermore, it is possible that in each instance, the grating lenses are arranged as reflection grating lenses.

In the interferometer described herein, the costly production of a beam-splitter cube and one or more triple prisms is omitted. According to example embodiments of the present invention, only plane plates, on which suitable grating structures and reflectors are disposed, are necessary to implement the optical functionality of these elements in the beam paths. Such plane plates, including the elements placed on them, may be produced simply and inexpensively using suitable lithography processes. For example, in so doing, costly polishing of 90° angles is not necessary. Furthermore, both the adhesives, necessary in conventional systems, in optically relevant areas of the beam paths, and the costly low-drift positioning of optical components in the beam paths are omitted.

Because of the use of grating lenses in the form of diffractive off-axis grating structures, a reduction of unwanted interference effects in the distance signals generated results as a further advantage. For example, interfering orders of diffraction are thereby separated in the signal generation and thus do not lead to harmonic or sub-harmonic oscillations in the distance signals attained.

It should also be mentioned that interferometers for a plurality of measuring axes possibly required may be constructed as described herein. In this context, substantially only plane plates are necessary as optically functionally-relevant components, on whose upper and lower sides the suitable grating structures and reflectors are disposed.

Further features and aspects of example embodiments of the present invention are described in more detail below with reference to the appended Figures.

DETAILED DESCRIPTION

Figure 1A:
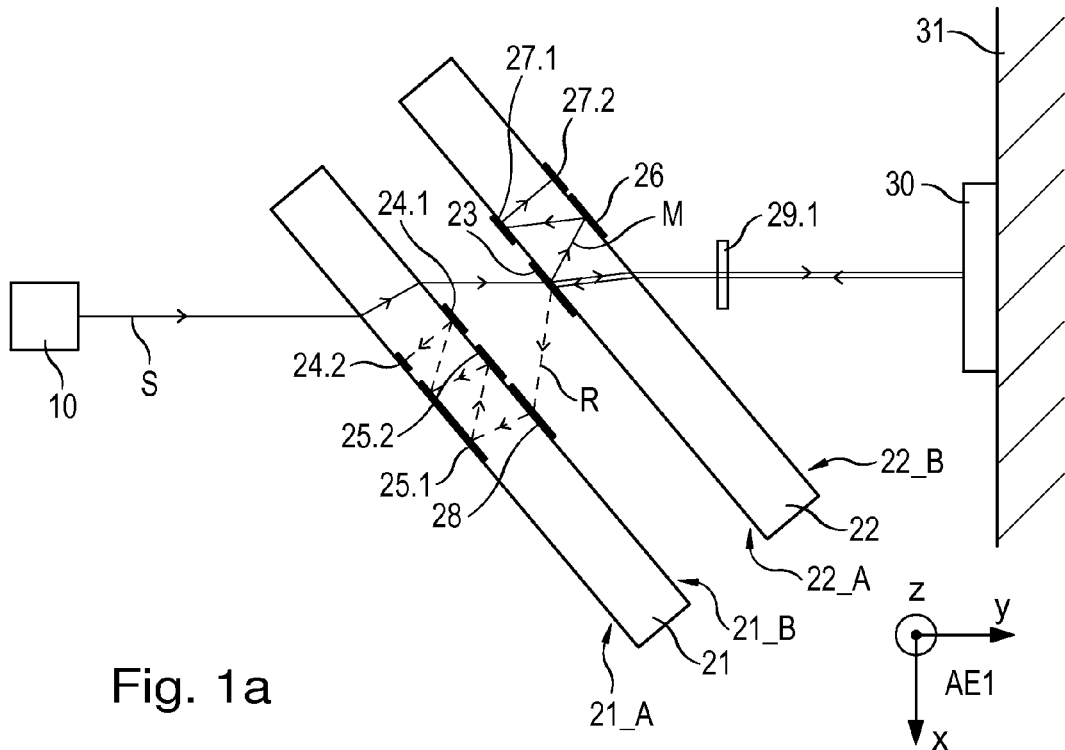
FIG. 1a illustrates a beam path of an interferometer according to an example embodiment of the present invention in a first splitting plane.
Figure 1B:
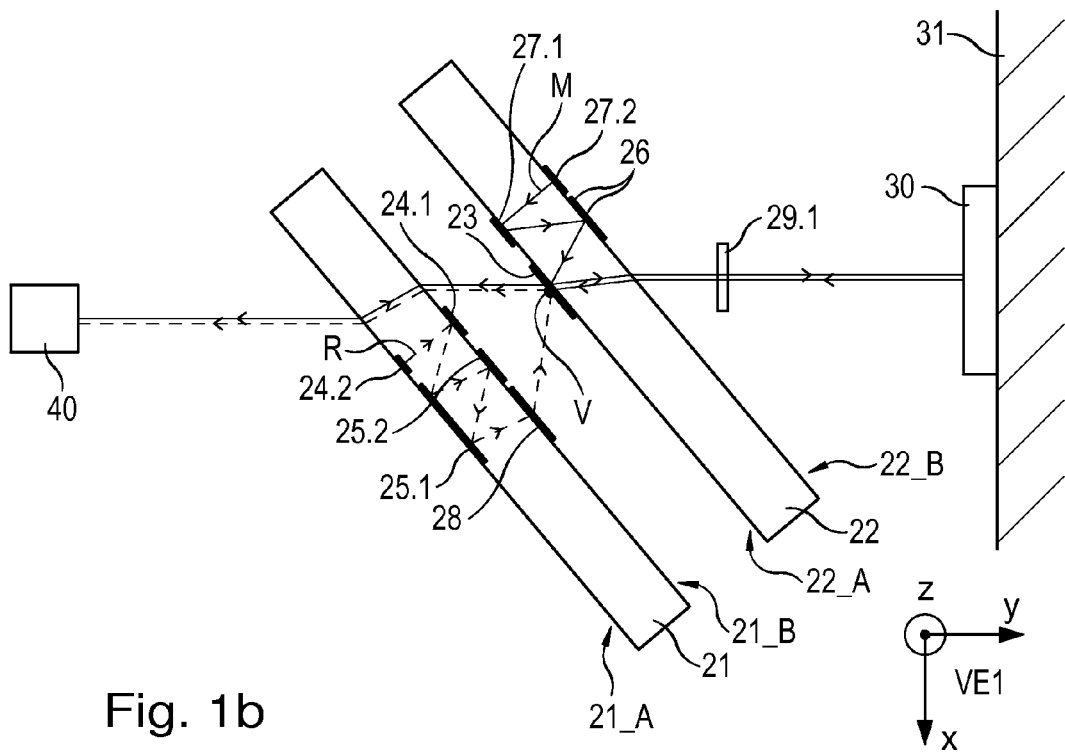
FIG. 1b illustrates the beam path of the interferometer in a first recombining plane.
Figure 1C:
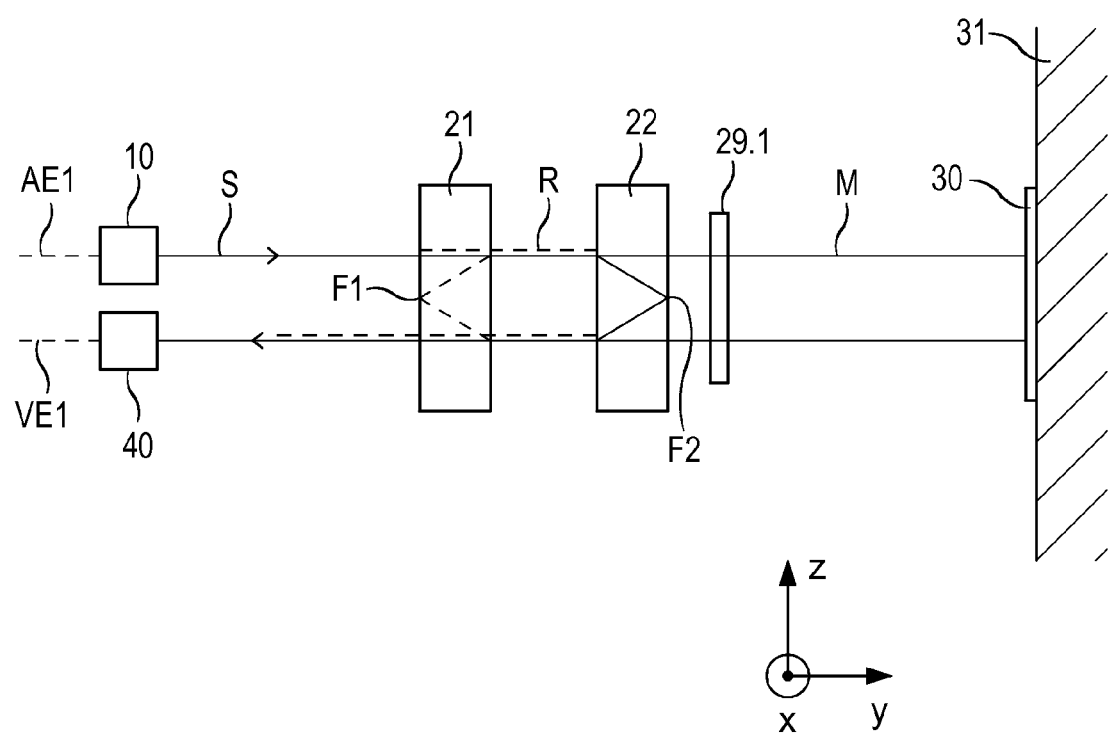
FIG. 1c illustrates the beam path of the interferometer in a further view.

An interferometer according to a first example embodiment of the present invention is described below with reference to FIGS. 1a to 1c, 2a to 2d, 3, and 4a to 4c. FIGS. 1a to 1c show the beam path in different views, and FIGS. 2a to 2d are plan views of various interferometer components from the viewing direction of the measuring reflector. FIGS. 3 and 4a to 4c represent only an alternative simplified depiction of the first exemplary embodiment, which will be discussed subsequent to the specific description of the beam path.

The interferometer includes at least one light source 10, a beam splitter 23, a measuring reflector 30, a reference retroreflector, a detector system 40, and two transparent plane plates 21, 22. The two plane plates 21, 22, formed of a suitable glass material, for example, are placed parallel to each other in the beam path between light source 10 and detector system 40. As illustrated in FIGS. 1a and 1b, the two plane plates 21, 22 are arranged to be non-parallel to measuring reflector 30, that is, at an angle not equal to 90° relative to the direction of incidence of beam of rays S. Measuring reflector 30 is joined to an object to be measured 31 that is disposed in a manner allowing movement along a measuring direction relative to the remaining interferometer components. Hereinafter, the measuring direction is denoted by coordinate y. For example, object to be measured 31 may be a machine part that is movable along measuring direction y. With the aid of the interferometer, at least one distance signal is ascertained with regard to a movement of the object to be measured 31 along measuring direction y. This distance signal may be used by a control unit for positioning purposes, for example.

In the following, the beam path for generating the at least one distance signal in the first exemplary embodiment is explained with reference to FIGS. 1*a* to 1*c* and 2*a* to 2*d*.

Figure 2A:
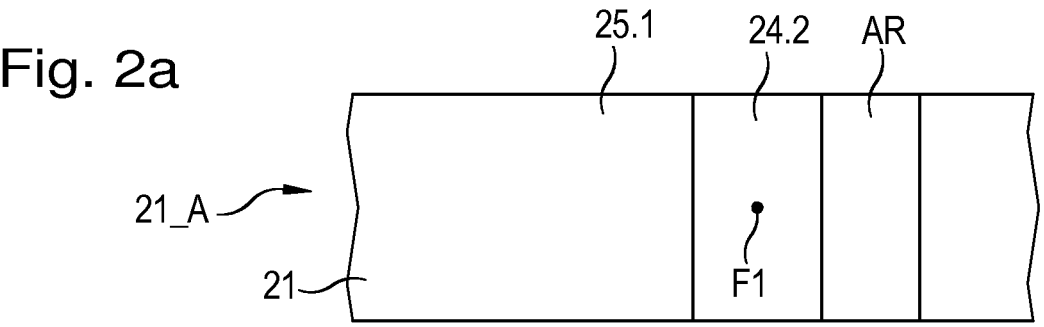
FIGS. 2a to 2d are plan views of various components of the interferometer, in a viewing direction from the measuring reflector.
Figure 2B:
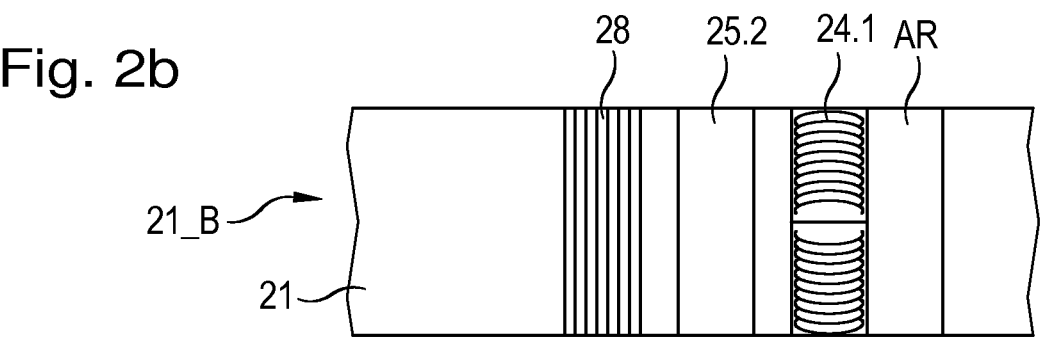
Figure 2C:
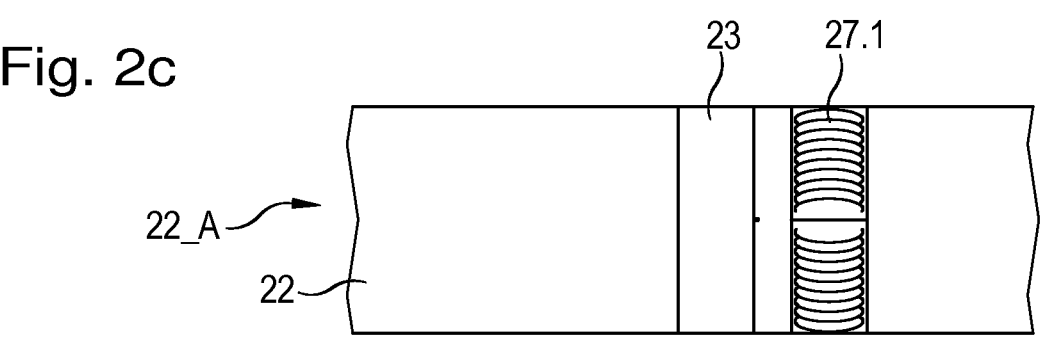

According to FIG. 1*a*, a beam of rays S, emitted by a light source 10, e.g., a suitable laser, initially passes through first transparent plane plate 21 in a first plane, which hereinafter is denoted as first splitting plane AE1 and coincides with the drawing plane of FIG. 1*a*. In this connection, beam of rays S has a linear polarization. The polarization plane is oriented at 45° relative to the x axis or y axis. Upon passing through plane plate 21, beam of rays S is deflected only at the air-glass or glass-air boundary surface of first plane plate 21 and propagates in the direction denoted by x, offset in parallel with respect to the direction of incidence, in the direction of second plane plate 22. In FIGS. 2*a* and 2*b*, which show plan views of first side 21_A and second side 21_B of first plane plate 21, the areas in which beam of rays S enters first plane plate 21 and emerges from it again are denoted by AR. An anti-reflective coating may be applied in those areas.

On second plane plate 22, beam of rays S then strikes beam splitter 23. In the present example, the beam splitter 23 is in the form of a polarization-optical beam-splitter layer located on the side of second plane plate 22 which is oriented in the direction of the first plane plate. Hereinafter, this side is denoted as first side 22_A of second plane plate 22. Alternatively, in principle, it would also be possible to form beam splitter 23 as a grating that has a grating period that is smaller than the wavelength of light source 10 used. Beam splitter 23 splits beam of rays S into at least one measuring beam M and at least one reference beam R which, because of the selected polarization of beam of rays S, possess the same intensity and, in each case, have a linear polarization, the polarization directions being oriented orthogonally relative to each other. These beams of rays M, R define first splitting plane AE1 already mentioned, which is identical to the drawing plane in FIG. 1*a*. Starting from the resultant splitting at beam splitter 23, FIGS. 1*a* to 1*c* illustrate measuring beam M with a solid line and reference beam R with a dotted line. Measuring beam M propagates in a measuring arm and reference beam R propagates in a reference arm until being recombined at a recombining location V in a first recombining plane VE1, which coincides with the drawing plane of FIG. 1*b*. First recombining plane VE1 is offset in the z-direction, parallel to first splitting plane AE1.

In the present exemplary embodiment, the linearly polarized beam of rays transmitted by beam splitter 23 forms measuring beam M, and the beam of rays reflected by beam splitter 23 and linearly polarized orthogonally to that acts as reference beam R.

Reference beam R is reflected back by beam splitter 23 in the direction of first plane plate 21 and impinges on a deflection grating 28 in the form of a transmission grating that is disposed on second side 21_B of first plane plate 21 that is oriented in the direction of second plane plate 22. Deflection grating 28 diverts reference beam R in the direction of a plane reflector 25.1 which is disposed on opposite first side 21_A of first plane plate 21 and whose reflective surface is oriented in the direction of opposite second side 21_B of first plane plate 21. Via reflector 25.1, reference beam R is diverted in the direction of a further plane reflector 25.2 on opposite second side 21_B of first plane plate 21, and is diverted there again in the direction of reflector 25.1 impinged upon first. After the second reflection at reflector 25.1, reference beam R finally arrives at a reference retroreflector. It reflects reference beam R falling on it back in a different plane and contrary to the direction of incidence.

The reference retroreflector is in the form of a diffractive retroreflector and includes at least one grating lens 24.1 and plane reflector 24.2. Grating lens 24.1, in the form of a reflection grating lens in the present exemplary embodiment, is located on second side 21_B of first plane plate 21. Provided on opposite first side 21_A is plane reflector 24.2, whose reflective surface is oriented in the direction of grating lens 24.1. The reflection grating lens used is what is referred to as an off-axis lens whose focus does not lie on an imaginary line that is perpendicular to the lens and extends through its midpoint. Because of this formation of grating lens 24.1, the desired diverting of the incident beam of rays is thereby obtained, analogous to a triple prism.

Thus, grating lens 24.1 diverts collimated reference beam R falling on it in first splitting plane AE1 and focuses it onto plane reflector 24.2. In FIGS. 1*c* and 2*a*, respectively, F1 denotes the point of incidence of reference beam R, focused via grating lens 24.1, on reflector 24.2. Reference is made, for instance, to the view of FIG. 1*c* with regard to the resultant diverting effect on reference beam R in the yz plane. Reference beam R is finally diverted by reflector 24.2 of the reference retroreflector into first recombining plane VE1 and then passes through grating lens 24.1 again. Via grating lens 24.1, reference beam R, now falling on it in divergent fashion, is diverted, collimated again and then propagates contrary to the direction of incidence in recombining plane VE1 via reflector elements 25.2, 25.1 in the direction of deflection grating 28 on second side 21_B of first plane plate 21. Deflection grating 28 brings about a further diverting of reference beam R, so that ultimately it propagates further in recombining plane VE1 in the direction of recombining location V on beam splitter 23.

In the illustrated exemplary embodiment, separate reflectors 25.1, 24.2 are provided on first side 21_A of first plane plate 21, which are impinged upon by reference beam R along its path. As an alternative, it is possible to provide only a single plane reflector here, which extends over a sufficiently large area on this side of first plane plate 21.

As mentioned above, the linearly polarized beam of rays transmitted at beam splitter 23 acts as measuring beam M and passes first of all through second plane plate 22, which it leaves at second side 22_B in parallel, offset along the x-direction. Measuring beam M then propagates a first time in the direction of measuring reflector 30 in the form of a plane mirror, upon which it falls perpendicularly. A λ/4-plate 29.1 is located in the beam path of measuring beam M between second plane plate 22 and measuring reflector 30. After the reflection back at measuring reflector 30 and the second traversal of λ/4-plate 29.1, measuring beam M has a polarization rotated by 90° and is reflected by beam splitter 23 in the direction of second side 22_B of second plane plate 22. Disposed there is a plane reflector 26 whose reflective surface is oriented in the direction of opposite first side 22_A of second plane plate 22. After the reflection at reflector 26, measuring beam M then arrives at a measuring retroreflector likewise in the form of a diffractive retroreflector. Via the measuring retroreflector, measuring beam M falling on it is reflected back in a different plane, e.g., in first recombining plane VE1, and in a direction opposite of the direction of incidence.

The diffractive measuring retroreflector includes at least one grating lens 27.1, e.g., in the form of a reflection grating lens or off-axis grating lens, disposed on one side 22_A of second plane plate 22, as well as a plane reflector 27.2 which is situated on opposite side 22_B of second plane plate 22 and whose reflective side is oriented in the direction of grating lens 27.1. Comparable to the reference retroreflector, the measuring retroreflector reflects the beam of rays, in this case, for example, measuring beam M, falling on it in first splitting plane AE1, back in a different plane, namely, first recombining plane VE1, and in a direction opposite of the direction of incidence.

Figure 2D:
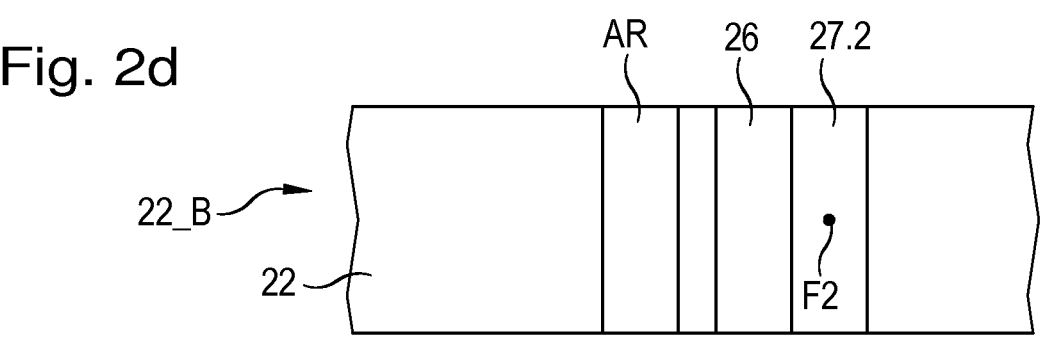

Grating lens 27.1 deflects measuring beam M incident in first splitting plane AE1 and focuses it onto opposite plane reflector 27.2. In FIGS. 1c and 2d, the point of incidence of focused measuring beam M on reflector 27.2 is denoted by F2. With regard to the resultant diverting effect on measuring beam M, reference is made again to the view of FIG. 1c. Measuring beam M is finally reflected and deviated by reflector 27.2 into first recombining plane VE1, and then passes again through grating lens 27.1. Via grating lens 27.1, divergently incident measuring beam M is diverted, collimated again and then propagates in reverse direction as in the incidence, via reflector element 26 in the direction of beam splitter 23. At beam splitter 23, linearly polarized measuring beam M is reflected in first recombining plane VE1 in the direction of measuring reflector 30, which subsequently is impinged upon a second time by measuring beam M, measuring beam M again falling perpendicularly onto measuring reflector 30. After the second reflection of measuring beam M at measuring reflector 30 and again passing twice through $\lambda/4$-plate 29.1, measuring beam M then propagates in first recombining plane VE1 to recombining location V on beam splitter 23. Since at this point, measuring beam M has a polarization rotated by 90°, it is transmitted by beam splitter 23 and propagates, superposed with reference beam R, in the direction of detector system 40. At least a first distance signal with regard to the position of object to be measured 31 is ascertainable via detector system 40 from interfering measuring and reference beams M, R superposed at recombining location. V There are various known possibilities with regard to the construction of detector system 40, which are indicated only briefly in the following.

For example, in a first variant, the detector system may include a $\lambda/4$-plate on the input side. Downstream of it is a splitting grating that splits the light falling on it into three beams of rays of equal intensity. In the beam paths of each of these split beams of rays, a polarization filter is disposed, their polarization directions in each case being rotated by 120° relative to each other. In turn, downstream of the polarization filters is, in each instance, an electro-optical detector element. Ultimately resulting at them are three distance signals phase-shifted by 120°, which are able to be further processed by the respective sequential electronics.

In addition, other variants of detector systems may also be used to generate a plurality of phase-shifted distance signals from two collinearly superposed, orthogonally polarized sub-beams. In this case, both linearly orthogonal and circularly orthogonal polarizations may be used which are able to be converted mutually via a $\lambda/4$-plate.

Analogous to first plane plate 21, on the part of second side 22_B of second plane plate 22, instead of placing the two reflectors 26, 27.2 there, only one reflector may be disposed, which has a sufficiently large surface.

Figure 3:
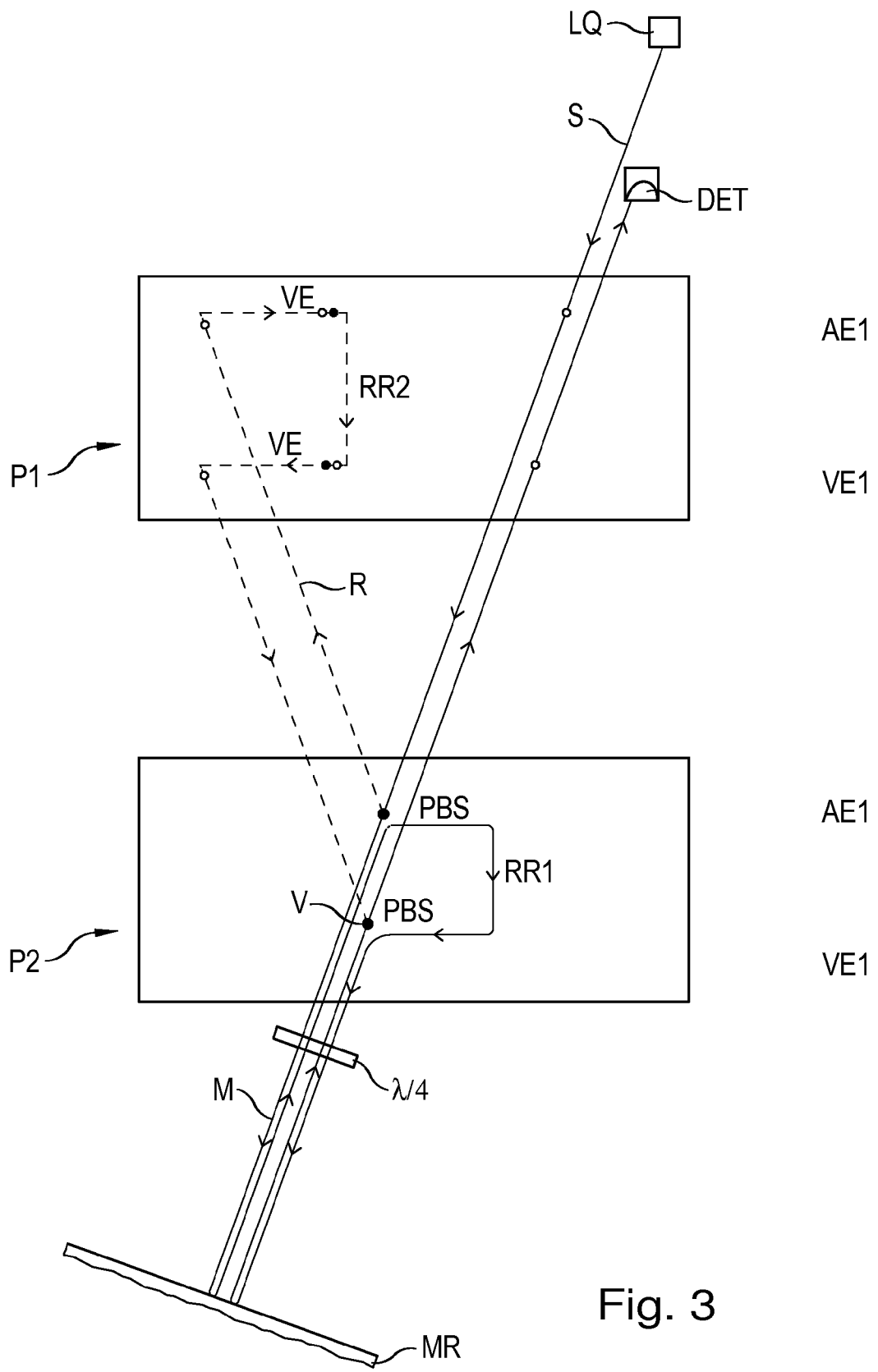
FIG. 3 illustrates the interferometer in an alternative representation.

An alternative representation of the first exemplary embodiment of the interferometer is explained in the following with reference to FIGS. 3 and 4a to 4c. FIG. 3 illustrates an alternative beam-path representation. The significant optical functional components of FIG. 3 are illustrated in detail in FIGS. 4a to 4c.

FIG. 3 schematically illustrates light source LQ, the two plane plates P1, P2, measuring reflector MR, and detector system DET. On the part of both plane plates P1, P2, optical components PBS, VE, RR1, RR2 are indicated only schematically. Going into detail, component PBS is the beam splitter in second plane plate P2. VE in each case denotes delay units in first plane plate P1, and RR1, RR2 each denote retroreflectors in second and first plane plates P2, P1, RR1 representing the measuring retroreflector and RR2 representing the reference retroreflector. Reference symbol $\lambda/4$ denotes a $\lambda/4$-plate in the measuring arm. First splitting plane AE1 and recombining plane VE1 mentioned above are likewise indicated in FIG. 3.

As illustrated in FIG. 3, beam of rays S emitted by light source LQ strikes beam splitter PBS in second plane plate P2 and is thereby split into a measuring beam M and a reference beam R which subsequently propagate in a measuring arm and a reference arm until being recombined.

After the splitting, reference beam R propagates in the direction of first plane plate P1, initially passes there through delay unit VE in first splitting plane AE1 in a first traversal direction, then undergoes a retroreflection via reference retroreflector RR2 and a deflection into first recombining plane VE1. Following that, reference beam R passes through delay unit VE in first recombining plane VE1 in a direction opposite of the first traversal direction and then arrives at a recombining location V on beam splitter PBS.

After the splitting, measuring beam M propagates in first splitting plane AE1 a first time through $\lambda/4$-plate $\lambda/4$ in the direction of measuring reflector MR and is reflected by it back in the direction of second plane plate P2. There, it arrives at measuring retroreflector RR1, via which a retroreflection and deflection into first recombining plane VE1 result. Measuring beam M then propagates a second time in the direction of measuring reflector MR and is reflected in first recombining plane VE1 back in the direction of recombining location V on beam splitter PBS, where it comes to interfering superposition with reference beam R. Following this, the pair of superposed beams of rays M, R propagates in the direction of detector system DET, via which at least one distance signal is able to be generated.

Figure 4A:
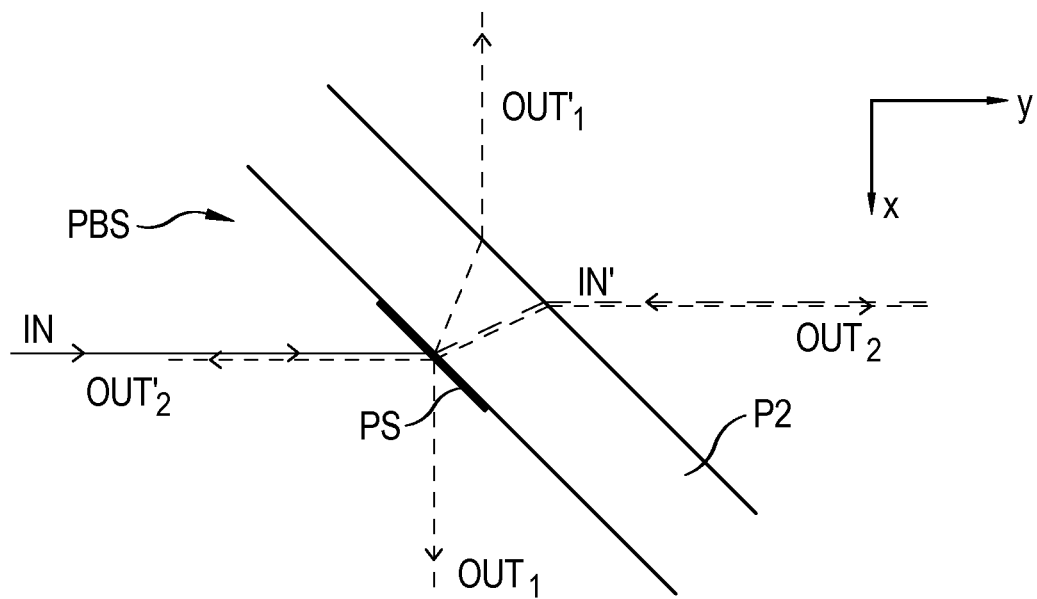
FIGS. 4a to 4c are detail views of several components of the interferometer illustrated in FIG. 3.

FIG. 4a, in a detailed representation, illustrates beam splitter PBS which includes a polarization-optical beam-splitter layer PS that is formed in second plane plate P2, as well as the decisive beam paths resulting at beam splitter PBS. Thus, the beam of rays incoming from direction of incidence IN is first split into one reference beam and one measuring beam whose directions of propagation are denoted by $OUT_1$ (reference beam) and $OUT_2$ (measuring beam). After the first reflection back at the measuring reflector the measuring beam again strikes beam splitter PBS, i.e., polarization-optical beam-splitter layer PS, and is reflected in direction of propagation $OUT_1'$. After the second reflection back at the measuring reflector, it arrives again at beam splitter PBS, i.e., polarization-optical beam-splitter layer PS, and together with the reference beam, is transmitted in a direction opposite of direction of incidence IN along direction of emergence $OUT_2'$ in the direction of the detector system.

Figure 4B:
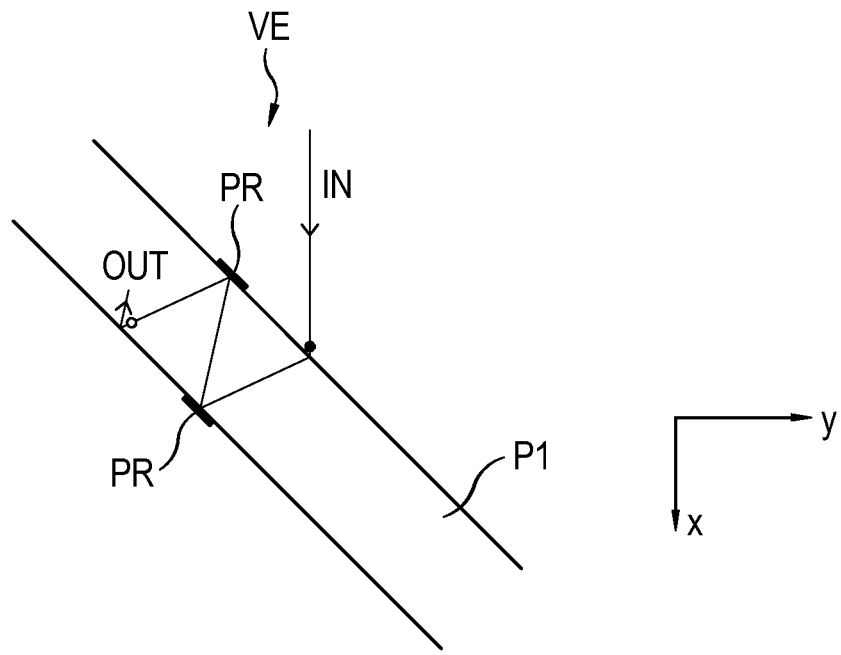

FIG. 4b schematically illustrates the beam path in delay unit VE provided in first plane plate P1. In this case, the reference beam falling on delay unit VE from direction of incidence IN propagates in first plane plate P1 a first time along or through delay unit VE. After the retroflection, it traverses delay unit VE a second time in reverse direction.

Delay unit VE includes at least two plane reflectors PR located on the opposite sides of first plane plate P1. In each instance, the reflective surfaces of reflectors PR are oriented in the direction of the opposite side of first plane plate P1. More than two reflectors PR may also be provided in the delay unit. In addition, deflection gratings may be disposed in the beam path in delay unit VE in order to suitably deviate the reference beam.

Thus, the optical path of the reference beam traversed in a plane plate P1, i.e., traversed in glass, may be adjusted in defined manner via delay unit VE. Preferably, this is carried out such that, between the splitting and the recombining, the reference beam and the measuring beam have traversed identical travel distances in the two plane plates P1, P2, i.e., in glass. In this manner, temperature stabilization of the interferometer may be obtained, e.g., possible temperature changes influence the beam paths of the measuring beam and reference beam in air and glass identically. Also, no faulty measurements result in the case of homogeneous temperature fluctuations. Moreover, in this connection, it is considered advantageous if, due to a suitable structural form, care is taken that the two plane plates have more or less the same temperature.

Figure 4C:
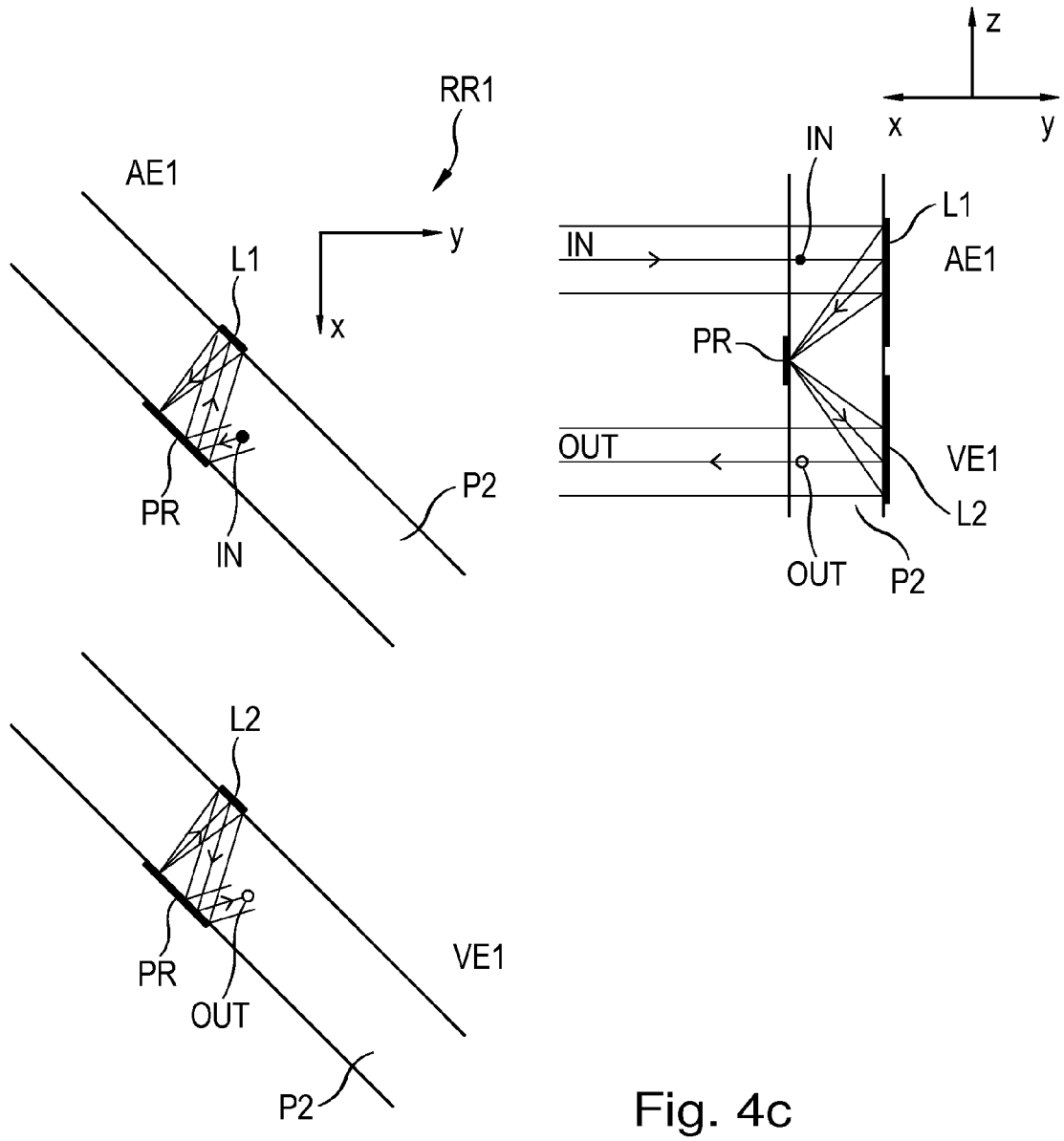

FIG. 4c illustrates the beam path of the measuring beam in measuring retroreflector RR1 in detail. In principle, the beam path of the reference beam in reference retroreflector RR2, whose detailed description is omitted, takes a course analogous to this.

The beam paths in measuring retroreflector RR1 of second plane plate P2 in first splitting plane AE1 as well as in first recombining plane VE1 are shown in the left part of FIG. 4c. A lateral view of the beam path in measuring retroreflector RR1 can be seen to the right. In first splitting plane AE1, the measuring beam incoming from direction of incidence IN, after a deflection at plane reflector PR, strikes a first grating lens L1 that has a focal length f and is in the form of a reflection grating lens. According to the lateral view shown to the right, first grating lens L1 deviates the incident measuring beam downward and focuses it onto an opposite plane reflector PR. This then directs the measuring beam back in the direction of opposite second grating lens L2. The measuring beam falling divergently on second grating lens L2 is deviated by second grating lens L2 such that it leaves measuring retroreflector RR1 in direction of emergence OUT, the direction of emergence being oriented contrary to direction of incidence IN. In addition, second grating lens L2 causes the measuring beam falling divergently on it to be collimated again. Thus, measuring reflector RR1 brings about a retroreflection of the incident measuring beam and a simultaneous displacement of it, e.g., in the z-direction. Due to the non-normal incidence of the measuring beam according to the depictions to the left in FIG. 4c, a spatial separation of the various orders of diffraction of the reflection grating lenses takes place. Interfering orders of diffraction, which can never be suppressed completely due to the tolerances of the grating manufacture, may thus easily be absorbed completely by mechanical stops. This is especially important, since by interference, weak interference beams of rays could already cause considerable disturbance in the measuring beam.

In principle, reference retroreflector RR2 in first plane plate P1 is also formed analogously to this, e.g., likewise as a diffractive retroreflector. It again includes two grating lenses in the form of reflection grating lenses which are disposed on one side of first plane plate P1, as well as one plane reflector situated on the opposite side.

The first exemplary embodiment explained in detail may be altered and modified within the spirit and scope hereof.

Thus, for example, in second plane plate 22, it is possible to alter the placement of the components of the measuring retroreflector to the effect that the two grating lenses are disposed on the second side of the second plane plate and the plane reflector is disposed on the first side. In this case, the measuring beam reflected back by the measuring reflector would be deflected by the beam splitter on the first side of the second plane plate onto the grating lens on the second side, then deflected in the direction of the reflector and focused, then reflected onto the grating lens on the second side and thereby deflected in a direction opposite of the direction of incidence and collimated again.

Moreover, it is possible to provide an alternative guidance of the beam path of reference beam R in second plane plate 22. Thus, in the example explained above, it is provided that reference beam R incoming for the first time from beam splitter 23 is deflected via deflection grating 28 on second side 21_B of first plane plate 21 in the direction of light source 10 before, after several reflections at reflectors 25.1, 25.2 of the delay unit, it falls on the reference retroreflector. In contrast to that, the deflection grating may also be omitted, so that the reference beam in the first plane plate initially propagates in the other direction, that is, away from the light source. Its compact construction should be mentioned as an advantage of such a variant if the intention is thereby to construct a multi-axis interferometer.

Figure 5:
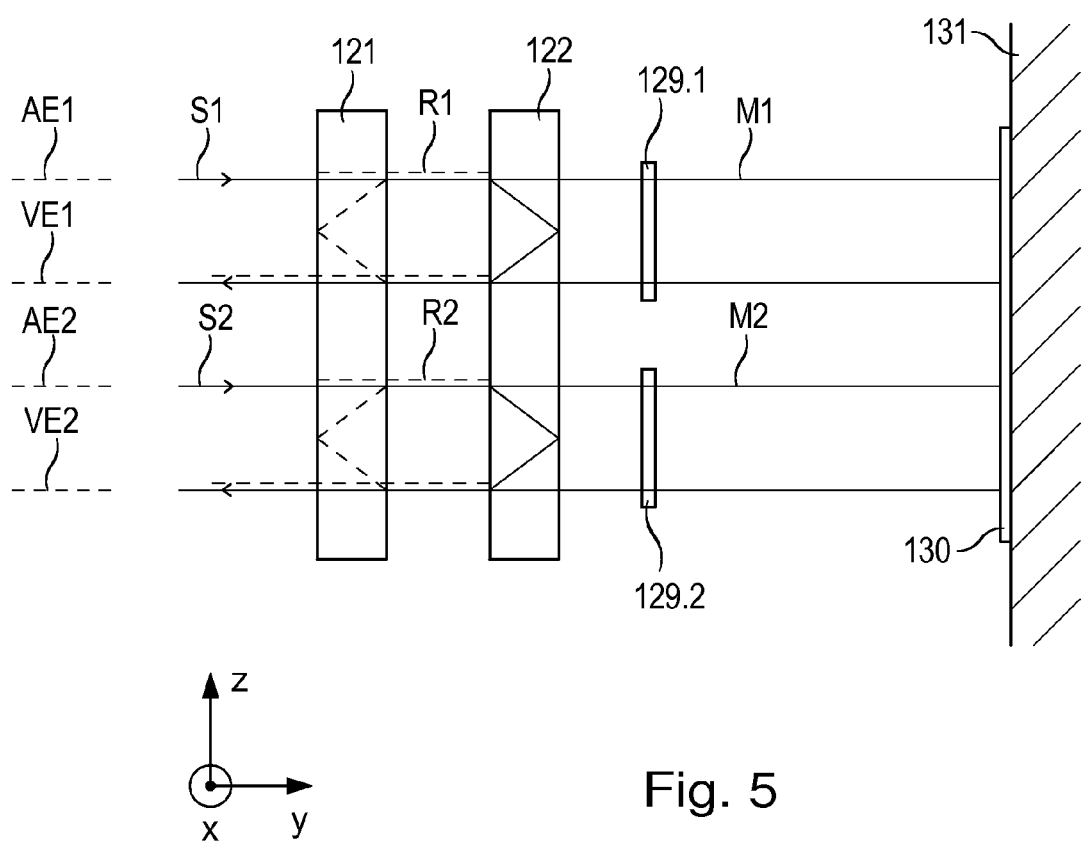
FIG. 5 illustrates the beam path of an interferometer according to an example embodiment of the present invention in a view analogous to that of FIG. 1c.

An interferometer according a second example embodiment of the present invention in the form of what is referred to as a two-axis interferometer is explained in the following with reference to FIG. 5. FIG. 5 shows a representation of a beam path analogous to that of FIG. 1c of the first exemplary embodiment explained above. In the following, only significant differences from the first exemplary embodiment are clarified.

In the second exemplary embodiment of the interferometer, in addition to a first measuring axis, a second measuring axis is formed along measuring direction y which takes a course set apart with respect to the first measuring axis in the indicated z direction. In this context, the first measuring axis is formed by a first measuring beam M1 which, together with first reference beam R1, has an identical beam path as in the first exemplary embodiment. The second measuring axis is formed perpendicularly set apart with respect to first splitting plane AE1, in that a second beam of rays S2 set apart in the z-direction in a second splitting plane AE2 falls on first plane plate 121, and a second measuring beam M2 as well as a second reference beam R2 result. The two measuring beams M1, M2 in each case pass through λ/4-plates 129.1, 129.2 again on their respective paths between second plane plate 122 and measuring reflector 130. Thus, the second measuring axis of this exemplary embodiment is defined via second measuring beam M2. In addition, the two plane plates 121, 122 are formed in a further area such that with regard to second incident beam of rays S2, an identical beam path results in a second splitting plane AE2 and in a second recombining plane VE2 as in first splitting and recombining planes AE1, VE1 for first incident beam of rays S1, and a second distance signal is thereby able to be generated. Therefore, no substantial extra expenses because of additional optical components result for a second measuring axis along measuring direction y either. The second measuring axis may be provided with the aid of the two existing plane plates which merely must be formed identically in further areas as with regard to the first measuring axis. The corresponding interferometer components in the form of beam splitters, reflectors, grating lenses, etc. may be applied in these further areas by suitable lithographic processes.

With the aid of this example embodiment of the interferometer as a two-axis interferometer, in addition to ascertaining the purely translatory movement along the y-direction, it is also possible to ascertain metrologically a possible tilting of object to be measured 131 about the x-axis. In so doing, a single light source may be used for determining the two degrees of freedom or axes. The splitting of the beam of rays emitted by the light source and the feeding to the two axes may be accomplished using fiber optics, e.g., with the aid of what is referred to as a fiber-optic splitter. However, splitting with the aid of conventional optical elements such as beam splitters in the form of thin-film beam splitters, beam splitter cubes or beam-splitter gratings or perhaps with the aid of deflecting mirrors is also possible.

Figure 6:
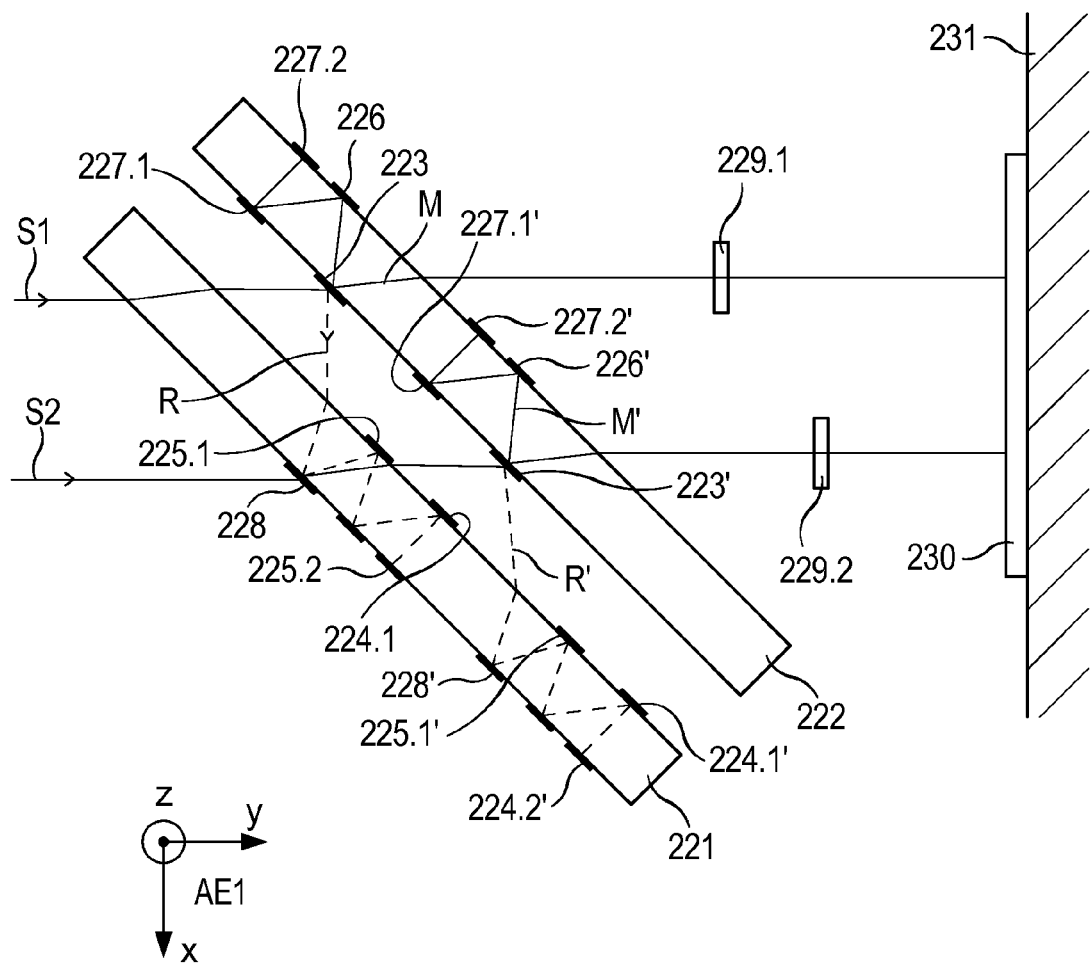
FIG. 6 illustrates a beam path of an interferometer according to an example embodiment of the present invention in a first splitting plane

An interferometer according to a third example embodiment of the present invention, again taking the form of a two-axis interferometer, is illustrated in FIG. 6. FIG. 6 shows a representation of a beam path in first splitting plane AE1 analogous to that of FIG. 1a of the first exemplary embodiment. In the following, again only the significant differences from the first exemplary embodiment are explained.

In addition to a first measuring axis having measuring and reference beams M,R, in the third exemplary embodiment of the interferometer, it is provided to form a second measuring axis having measuring and reference beams M', R' along measuring direction y, as well. However, in contrast to the previous exemplary embodiment, the second measuring axis, i.e., second measuring beam M', takes a course set apart in the x-direction relative to the first measuring axis having first measuring beam M.

Therefore, to form the second measuring axis along measuring direction y, it is provided that in first splitting plane AE1, a second beam of rays S2, set apart in the x-direction, falls on first plane plate 221. The two plane plates 221, 222 are each formed in a further area such that an identical beam path results with regard to second incident beam of rays in first splitting plane AE1 and in the first recombining plane as in the case of first incident beam of rays S1, and a second distance signal is thereby able to be generated.

As illustrated in FIG. 6, in the left part, second plane plate 222 has components 223, 226, 227.1, 227.2 explained above, which, similar to the first exemplary embodiment, are impinged upon by first measuring beam M. A second set of such components 223', 226', 227.1', 227.2' is disposed in the right part of second plane plate 222, and is impinged upon by second measuring beam M' in analogous fashion.

In a similar manner, the various components 228, 225.1, 225.2, 224.1, 224.2 for first reference beam R are provided in the left part of first plane plate 221, which again are impinged upon, identical to the first exemplary embodiment. A second set of such components 228', 225.1', 225.2', 224.1', 224.2' is disposed in the right part of first plane plate 221, they again being impinged upon in analogous fashion by second reference beam R'.

Thus, a second distance signal with regard to a shift of object 231 along measuring direction y is able to be generated in the first recombining plane from the interfering superposition of second measuring beam M' with second reference beam R'. In addition to the purely translatory movement along the y-direction, with the aid of this example embodiment of the interferometer, a possible tilting of object to be measured 231 about the z-axis may also be detected using measuring techniques. With regard to the construction of the light source and the detector system, reference is made to the explanations concerning the previous exemplary embodiments.

The variants and exemplary embodiments of the interferometer as one-axis and two-axis interferometers explained up to now may be suitably combined depending on the practical application, to in this manner also form three-axis and four-axis interferometers.

For example, a combination of the second and third exemplary embodiments may be provided, to form a three-axis interferometer. It then has a first measuring axis according to the first exemplary embodiment along measuring direction y, a second measuring axis, set apart in the z-direction, according to the second exemplary embodiment, as well as a third measuring axis, set apart in the x-direction, according to the third exemplary embodiment. Besides the detection of a translatory object movement along measuring direction y, it is therefore possible to detect rotational movements of the object about axes x and z, as well.

A four-axis interferometer may be formed from the combination of the second and third exemplary embodiments, e.g., by a combination of two measuring axes interlaced according to FIG. 6, disposed one upon the other according to FIG. 5, etc.

Figure 7:
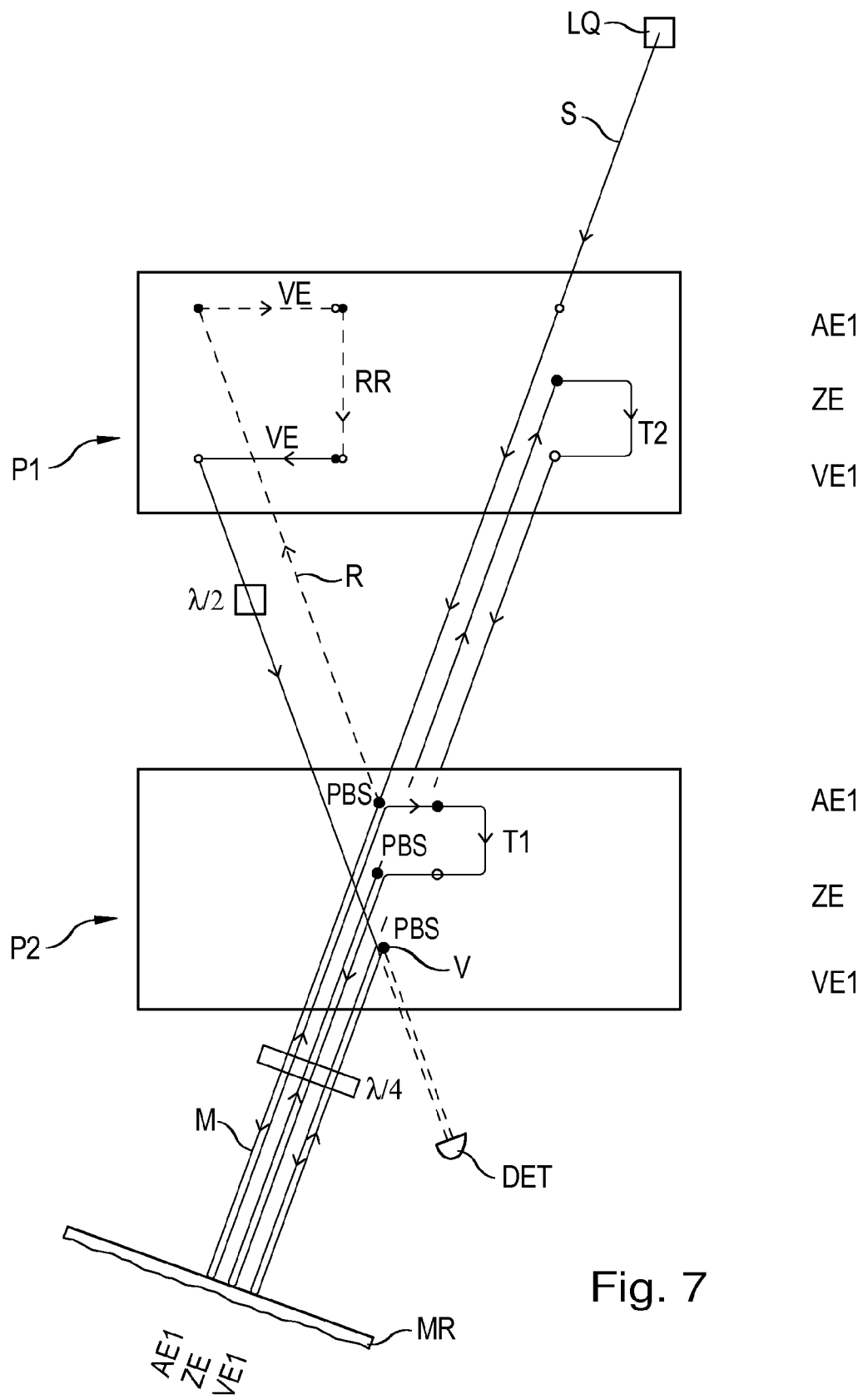
FIG. 7 illustrates an interferometer according to an example embodiment of the present invention in a representation analogous to that of FIG. 3.
Figure 8A:
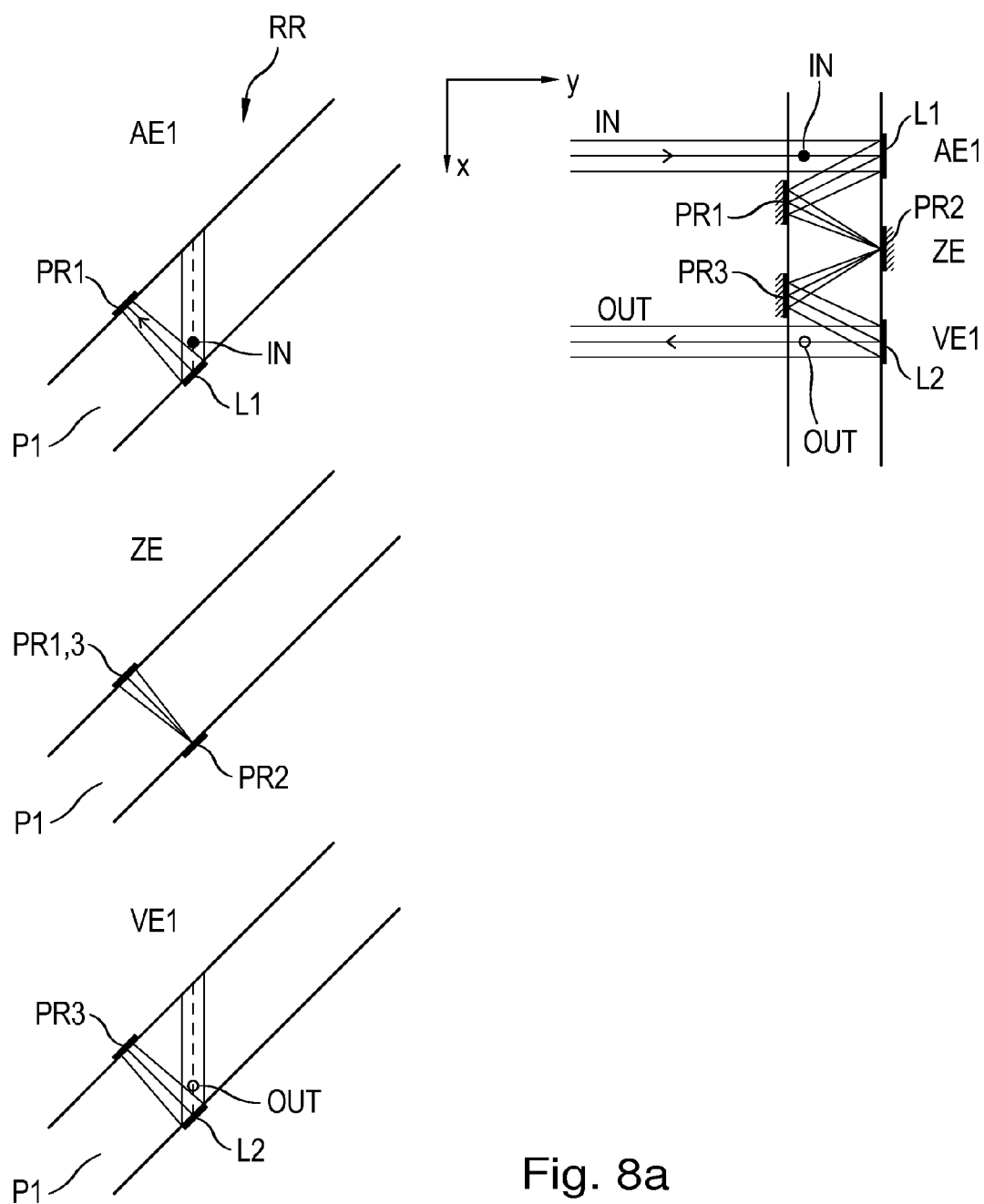
FIGS. 8a and 8b are detail views of components of the interferometer illustrated in FIG. 7.
Figure 8B:
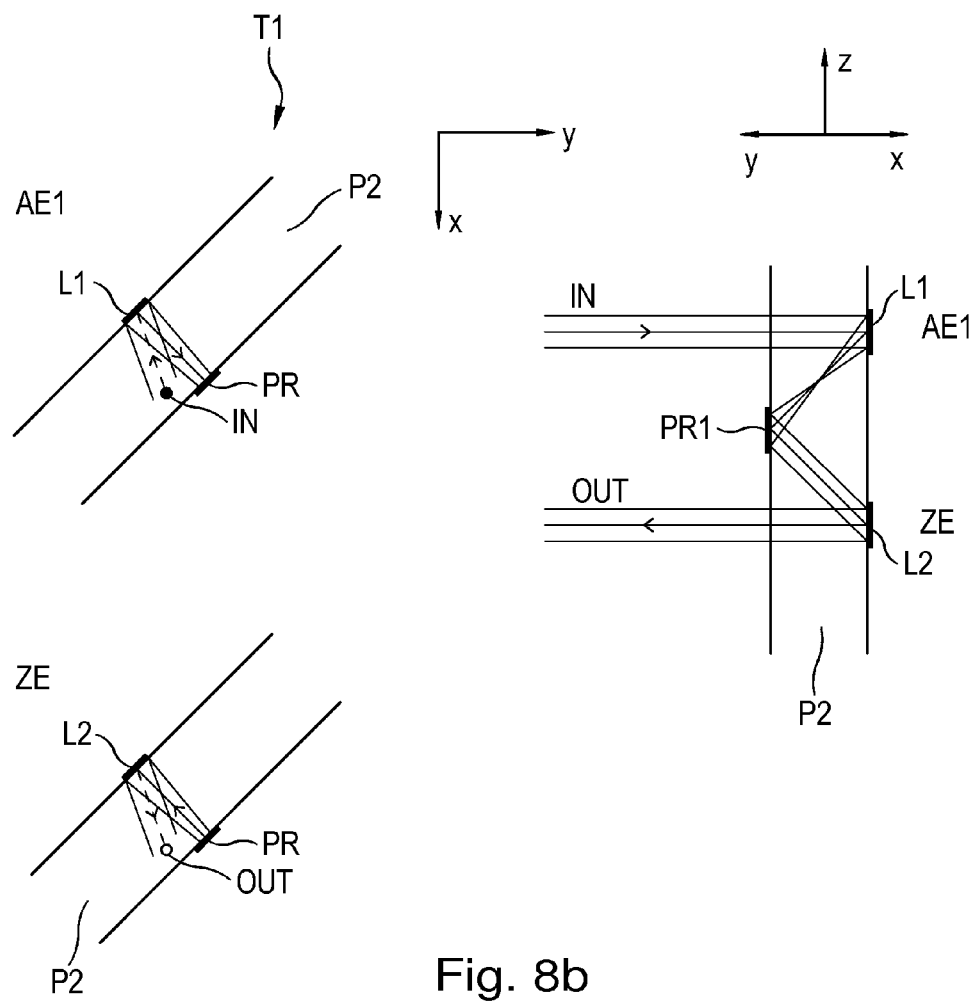

An interferometer according to a fourth example embodiment of the present invention is explained with reference to FIGS. 7, 8a, and 8b. FIG. 7 shows a representation of a beam path according to the alternative representation of the first exemplary embodiment illustrated in FIG. 3, and FIGS. 8a, 8b illustrate individual optical components from FIG. 7 in greater detail.

The example embodiment of the interferometer illustrated in FIG. 7 includes a light source LQ, two plane plates P1, P2, a measuring reflector MR, and a detector system DET. On the part of the two plane plates P1, P2, optical components PBS, VE, RR, T1, T2 are again indicated only schematically. Going into detail, component PBS is a beam splitter in second plane plate P2, VE in each case denotes delay units in first plane plate P1, a reference retroreflector provided in first plane plate P1 is denoted by RR, and T1, T2 denote a first and second imaging element in second and first plane plates P2, P1. In addition, as illustrated in FIG. 7, a λ/2-plate and a λ/4-plate are disposed in the various beam paths. A first splitting plane AE1, an intermediate plane ZE, and a first recombining plane VE1 are also illustrated in FIG. 7.

According to FIG. 7, beam of rays S emitted by light source LQ strikes beam splitter PBS in second plane plate P2 and is thereby split into a measuring beam M and a reference beam R. Beams of rays M, R subsequently propagate in a measuring arm and in a reference arm, analogous to the previous exemplary embodiments, until being recombined at recombining location V on beam splitter PBS.

After the splitting at beam splitter PBS, reference beam R first of all propagates in the direction of first plane plate P1, initially passes there through delay unit VE in first splitting plane AE1 in a first traversal direction, then undergoes a retroreflection via reference retroreflector RR and a deflection into first recombining plane VE1. Following that, reference beam R passes through delay unit VE in first recombining plane VE1 in a second traversal direction opposite of the first traversal direction, and after passing through a λ/2-plate, finally arrives at recombining location V on beam splitter PBS in first recombining plane VE1 of second plane plate P2. The λ/2-plate rotates the polarization direction of reference beam R by 90°, so that at recombining location V, two beams of rays polarized orthogonally relative to each other are present, which may then be evaluated in polarization-optical fashion as explained above.

After the splitting at beam splitter PBS, measuring beam M propagates in first splitting plane AE1 a first time in the direction of measuring reflector MR and is reflected back by it in the direction of second plane plate P2 in the same plane.

In the process, measuring beam M passes twice through a λ/4-plate and after the second traversal, has a polarization rotated by 90°. Measuring beam M thus polarized is reflected by beam splitter PBS in second plane plate P2 and then arrives at first imaging element T1 in second plane plate P2. First imaging element T1 images and deflects measuring beam M into an intermediate plane ZE which is oriented parallel to first splitting plane AE1 and is situated between first splitting plane AE1 and first recombining plane VE1. In intermediate plane ZE, measuring beam M is then deviated via beam splitter PBS a second time in the direction of measuring reflector MR. Via measuring reflector MR, a second reflection results back in the direction of second plane plate P2. After the twice-repeated traversal of the λ/4-plate again, measuring beam M has a polarization such that it is transmitted by beam splitter PBS in the direction of first plane plate P1. Measuring beam M then propagates in intermediate plane ZE to first plane plate P1 and strikes there on second imaging element T2. Via second imaging element T2, measuring beam M is imaged and deflected from intermediate plane ZE into first recombining plane VE1, where measuring beam M then propagates in the direction of beam splitter PBS in second plane plate P2. Measuring beam M is transmitted by beam splitter PBS and then propagates a third time in the direction of measuring reflector MR, now in first recombining plane VE1. After being reflected back once more or a third time at measuring reflector MR and again passing twice through the λ/4-plate, measuring beam M again has a polarization rotated by 90° and is reflected at recombining location V by beam splitter PBS together with reference beam R in the direction of detector system DET. Following this, the pair of superposed interfering beams of rays M, R propagates in the direction of detector system DET, via which at least one distance signal is able to be generated in a manner such as that already explained above.

In the following, only those optical components of the fourth example embodiment of the interferometer that differ substantially from those of the first exemplary embodiment are described in detail. They are substantially only reference retroreflector RR in first plane plate P1 and imaging elements T1, T2 in second plane plate P2 and in first plane plate P1, respectively. Reference is made to the description of FIGS. 4a and 4b above with regard to beam splitter PBS in second plane plate P2 and delay unit VE in first plane plate P1. These components are formed analogously to those of the fourth example embodiment of the interferometer.

FIG. 8a illustrates in detail the beam path of the reference beam in reference retroreflector RR of the fourth exemplary embodiment. Shown in the left part of FIG. 8a are the beam paths in reference retroreflector RR in first splitting plane AE1, in intermediate plane ZE and in first recombining plane VE1. A lateral view of the beam path of the reference beam in reference retroreflector RR is shown to the right. Comparable to the previous exemplary embodiments, the various elements of reference retroreflector RR are again formed on the two opposite sides of first plane plate P1.

In first splitting plane AE1, the reference beam incoming from direction of incidence IN strikes a first grating lens L1 in the form of a reflection grating lens. According to the lateral view shown to the right, first grating lens L1 deviates the incident reference beam downward onto an opposite first plane reflector PR1. This then directs the reference beam back in the direction of an opposite second plane reflector PR2 which is situated in intermediate plane ZE. As illustrated in FIG. 8a, first grating lens L1 also focuses the reference beam onto second plane reflector PR2. The focused reference beam falling on second plane reflector PR2 is thereby deflected to an again opposite third plane reflector P3 and is then directed by it back to a second grating lens L2. Via second grating lens L2, the divergently incident reference beam is deviated such that it leaves reference retroreflector RR in direction of emergence OUT, direction of emergence OUT being oriented opposite of direction of incidence IN and being offset in the x-direction relative to it. In addition, the reference beam falling divergently on second grating lens L2 is collimated by it again. The two grating lenses L1, L2 used have the same focal length. Thus, diffractive reference retroreflector RR used in this exemplary embodiment differs from those in the previous exemplary embodiments in that a multiple deviation of the reference beam via three plane reflectors PR1, PR2, PR3 and imagings and deviations via two grating lenses L1, L2 from first splitting plane AE1 via intermediate plane ZE into first recombining plane VE1 are provided in it. Comparable to the previous variants however, this retroreflector RR also brings about a reflection of the beam of rays falling on it in a plane of incidence back in a direction opposite of the direction of incidence, the beam of rays reflected back propagating in a plane of emergence, and the plane of incidence and plane of emergence being offset relative to each other.

Finally, the detailed construction and the optical functioning of first imaging element T1 in second plane plate P2 are explained with reference to FIG. 8b. In principle, second imaging element T2 in first plane plate P1 is formed analogously to it, as well.

The beam paths of the measuring beam in first imaging element T1 in first splitting plane AE1 as well as in first recombining plane VE1 are shown to the left in FIG. 8b. A lateral view of the corresponding beam path in first imaging element T1 can be seen to the right. As illustrated, the various elements of first imaging element T1 are formed on the two opposite sides of second plane plate P2.

In first splitting plane AE1, the measuring beam incoming from direction of incidence IN strikes a first grating lens L1 which is in the form of a reflection grating lens and has a focal length f. According to the lateral view shown to the right, first grating lens L1 deflects the incident measuring beam downward and focuses it into a plane which is set apart from the side of plane plate P2 that bears grating lens L1, the distance 2·D/3, if D denotes the thickness of plane plate P2. Focal length f of first grating lens L1 is selected to be f=2·D/3. Following this, the measuring beam strikes a first plane reflector PR1 which is disposed on the opposite side of second plane plate P2 and whose reflective surface is oriented in the direction of first grating lens L1. Plane reflector PR1 directs the measuring beam back in the direction of opposite second grating lens L2 which is situated in intermediate plane ZE and is in the form of a reflection grating lens. Second grating lens L2 collimates the measuring beam falling divergently on it and has a focal length 2f in glass which is twice as great as focal length f of first grating lens L1. The measuring beam falling on second grating lens L2 is deviated by second grating lens L2 such that it leaves first imaging element T1 in intermediate plane ZE in direction of emergence OUT, direction of emergence OUT being oriented contrary to direction of incidence IN. In addition, the measuring beam falling divergently on second grating lens L2 is collimated by it again. Furthermore, because of the selected focal lengths of the first and second grating lenses, the beam diameter of the incident measuring beam is enlarged, e.g., in the present case, the measuring beam emerging from imaging element T1 in intermediate plane ZE in direction of emergence OUT has double the beam diameter compared to the measuring beam falling on imaging element T1.

Second imaging element T2 disposed in first plane plate P! has a construction comparable to this. Thus, it includes a third and fourth grating lens as well as a second plane reflector, the grating lenses on one hand and the plane reflector on the other hand being disposed on the opposite sides of first plane plate P1, and the reflective surface of the reflector being oriented in the direction of the grating lenses. The third grating lens, upon which the measuring beam incoming from the second plane plate initially falls, has double the focal length $2f$ in glass as the fourth grating lens having focal length f'=2·D'/3, where D' denotes the thickness of plane plate P2. The third grating lens is situated in intermediate plane ZE and the fourth grating lens is situated in first recombining plane VE1. Analogous to the first grating lens of the first imaging element, the third grating lens focuses the incident measuring beam, and the fourth grating lens collimates the measuring beam again, analogous to the second grating lens. Via second imaging element T2, measuring beam M falling on it is thus first of all deviated into first recombining plane, and secondly, the beam diameter is halved again.

The significant differences of the fourth exemplary embodiment of the interferometer from the variants described above are that measuring beam M impinges a total of three times on measuring reflector MR and the two imaging elements T1, T2 are disposed in the measuring arm. Because of the focal-length dimensioning selected for the grating lenses used, the beam diameter of measuring beam M is doubled or halved via imaging elements T1, T2. In this manner, it is ensured that upon the second impingement on measuring reflector MR, measuring beam M falls perpendicularly upon measuring reflector MR, even if measuring reflector MR should possibly be tilted relative to the setpoint position. Therefore, an overall system especially insensitive to tilting results.

Besides the exemplary embodiments specifically described, there are additional embodiment possibilities within the spirit and scope hereof.

Thus, for example, it is possible to construct a multi-axis configuration in which the necessary beam splitting for the various measuring axes is not carried out externally via a fiber-optic splitter, and a separate feeding of the illuminating beams of rays to the individual measuring axes takes place. In such a variant, this beam splitting is accomplished via beam-splitter elements that are integrated into the plane plates, for example, suitable gratings or beam-splitter layers.

In addition, it is possible to compensate for the optical path-length differences, caused by the λ/4-plates in the beam paths in the measuring arm, by compensating elements in the reference arm. For instance, suitably dimensioned compensating glasses or a reference plate adapted in thickness may be provided for that purpose.

Furthermore, the interferometer may also be made monolithic by cementing the two plane plates to each other and possibly providing a spacer plate between the two plane plates.

The various exemplary embodiments of the interferometer may be implemented both as homodyne and as heterodyne variants.

In the case of a homodyne evaluation, the detector system includes on the incoming side a λ/4-plate as well as a downstream splitting grating. The sub-beams, polarized orthogonally relative to each other and striking the λ/4-plate, are converted via it into light polarized right-hand circularly and left-hand circularly. They are superposed again to form linearly polarized light which rotates relative to each other with the phase shift of the light waves. This rotating, linearly polarized light is split by the splitting grating into three beams of rays equal in intensity. These beams of rays pass through three polarization filters which are oriented at 120° relative to each other, before they strike downstream detector elements at which distance signals phase-shifted by 120° are then available, which are able to be processed further for the position evaluation. The distance signals may either be converted into electrical signals in the interferometer, or else transmitted via multimode optical fibers to remotely located sequential electronics.

In the case of a desired heterodyne evaluation, two sub-beams having different frequencies and different polarizations (p, s) are fed into the interferometer. They then pass through different paths in the measuring arm and reference arm, are coupled on the output side into a multimode optical fiber and transmitted to sequential electronics, where the relevant phase information is obtained from a superposition with a local oscillator.

What is claimed is:

1. An interferometer, comprising
   a light source;
   a beam splitter adapted to split a first beam of rays, emitted by the light source, into at least one measuring beam and at least one reference beam, to define a first splitting plane, such that the measuring beam propagates in a measuring arm and the reference beam propagates in a reference arm until being recombined at a recombining location in a first recombining plane, the first recombining plane being oriented parallel to the first splitting plane;
   a measuring reflector arranged in the measuring arm and joined to an object to be measured that is movable along a measuring direction, the measuring reflector being arranged such that the measuring beam falls perpendicularly on the measuring reflector at least twice;
   a reference retroreflector being arranged in the reference arm, such that the reference beam falls on the reference retroreflector at least once;
   a detector system adapted to ascertain at least a first distance signal regarding a position of the object to be measured from the interfering measuring and reference beams superposed at the recombining location;
   a first transparent plane plate and a second transparent plane plate arranged parallel to each other in the beam path between the light source and the detector system, the measuring reflector being movable along the measuring direction relative to the two plane plates;
   wherein the reference retroreflector is arranged in the first plane plate; and
   wherein the beam splitter is arranged on the second plane plate.

2. The interferometer according to claim 1, wherein the reference retroreflector in the first plane plate includes a diffractive retroreflector and includes at least one grating lens situated on one side of the first plane plate and at least one plane reflector situated on an opposite side of the first plane plate, a reflective side of the plane reflector being oriented in a direction of the grating lens, the at least one grating lens being adapted to deflect and focus the reference beam falling grating lens onto the reflector.

3. The interferometer according to claim 2, wherein each grating lens includes a reflection grating lens.

4. The interferometer according to claim 1, wherein the first plane plate includes at least one delay unit along which the reference beam propagates, and the delay unit includes at least two plane reflectors which are disposed on opposite sides of the first plane plate, reflective surfaces of the reflectors each being oriented in a direction of the opposite side of the first plane plate.

5. The interferometer according to claim 4, wherein the at least one delay unit, which is traversed by the reference beam in the first plane plate, is arranged such that between the splitting and the recombining, the reference beam and the measuring beam traverse identical travel distances in the two plane plates.

6. The interferometer according to claim 1, wherein the beam splitter is formed on the second plane plate as a polarization-optical beam-splitter layer situated on a first side of the second plane plate that is oriented in a direction of the first plane plate.

7. The interferometer according to claim 1, further comprising at least one measuring retroreflector arranged as a diffractive retroreflector in the second plane plate and including at least one grating lens situated on one side of the second plane plate and at least one plane reflector disposed on an opposite side of the second plane plate having a reflective side oriented in a direction of the grating lens, the grating lens being adapted to deflect and focus the measuring beam falling on the grating lens onto the reflector.

8. The interferometer according to claim 1, wherein set apart perpendicularly relative to the first splitting plane, at least one second beam of rays falls on the first plane plate in a second splitting plane, and the two plane plates are formed in a further area such that with regard to the second beam of rays, an identical beam path results in the second splitting plane and in a second recombining plane as in the first splitting and recombining planes, and a second distance signal concerning the movement of the object to be measured along the measuring direction is generatable.

9. The interferometer according to claim 1, wherein in the first splitting plane, set apart from the first beam of rays, at least one second beam of rays falls on the first plane plate, and the two plane plates are formed in a further area such that with regard to the second beam of rays, an identical beam path results in the first splitting plane and in the first recombining plane as in the first beam of rays, and a second distance signal concerning the movement of the object to be measured along the measuring direction is generatable.

10. The interferometer according to claim 9, wherein each grating lens includes a reflection grating lens.

11. The interferometer according to claim 1, wherein the second plane plate includes a first imaging element having:
at least one first grating lens and second grating lens, both being arranged on one side of the second plane plate; and
at least one first plane reflector arranged on an opposite side of the second plane plate and having a reflective side oriented in a direction of the first and second grating lenses, the first imaging element adapted to enlarge a beam diameter of the measuring beam falling on the first imaging element;

wherein the first plane plate includes has a second imaging element having:
at least one third grating lens and fourth grating lens, both being arranged on one side of the first plane plate; and
a second plane reflector arranged on an opposite side of the first plane plate and having a reflective side oriented in a direction of the third and fourth diffractive grating lenses, the second imaging element adapted to reduce the beam diameter of the measuring beam falling on the second imaging element.

12. The interferometer according to claim 11, wherein each of the first and third grating lenses is adapted to focus the measuring beam, and each of the second and fourth grating lenses is adapted to collimate the measuring beam.

13. The interferometer according to claim 12, wherein after passing through the first imaging element, the measuring beam propagates in an intermediate plane in a direction of the measuring reflector, the intermediate plane being located between the first splitting plane and the first recombining plane and being oriented parallel to the first splitting plane and the first recombining plane, and after passing through the second imaging element, the measuring beam propagates in the first recombining plane.

14. The interferometer according to claim 13, wherein the reference retroreflector is formed in the first plane plate as a diffractive retroreflector and includes two grating lenses and a plane reflector disposed on one side of the first plane plate and two plane reflectors disposed on an opposite side of the first plane plate, reflective sides of the reflectors being oriented toward an opposite side, such that the reference beam falling on the first plane plate in the first splitting plane initially passes through an optically ineffective area of the first plane plate and strikes the first grating lens, by which the reference beam is deflected in a direction of an opposite first plane reflector, the first plane reflector deflects the reference beam in a direction of an opposite second plane reflector in the intermediate plane, the second plane reflector deflects the reference beam in a direction of an opposite third plane reflector, and the third plane reflector deflects the reference beam in a direction of the second grating lens in the first recombining plane.

15. The interferometer according to claim 14, wherein each grating lens includes a reflection grating lens.

* * * * *